United States Patent
Schäfer et al.

(10) Patent No.: US 6,743,835 B2
(45) Date of Patent: Jun. 1, 2004

(54) PREPARATION OF NONDUSTING FREE-FLOWING PIGMENT CONCENTRATES

(75) Inventors: Werner Schäfer, Essen (DE); Manfred Scheiba, Essen (DE); Stefan Stadtmüller, Essen (DE); Markus Weimann, Bottrop (DE); Karlheinz Rümpler, Weimar (DE); Ulrich Walter, Weimar (DE)

(73) Assignee: Goldschmidt AG, Essen (DE)

( * ) Notice: Subject to any disclaimer, the term of this patent is extended or adjusted under 35 U.S.C. 154(b) by 78 days.

(21) Appl. No.: 10/006,962

(22) Filed: Dec. 5, 2001

(65) Prior Publication Data

US 2002/0161083 A1 Oct. 31, 2002

(30) Foreign Application Priority Data

Dec. 7, 2000 (DE) .......................... 100 60 718

(51) Int. Cl.$^7$ ................................ C08L 3/02
(52) U.S. Cl. .................. 523/330; 523/332; 523/333; 524/474; 524/275; 524/277; 524/582; 524/585; 524/575; 524/577; 524/560; 524/567
(58) Field of Search ................ 523/333, 330, 523/332, 340; 524/474

(56) References Cited

U.S. PATENT DOCUMENTS

| | | | | |
|---|---|---|---|---|
| 3,755,244 A | * | 8/1973 | Hart .......................... 260/41 R |
| 4,127,422 A | * | 11/1978 | Guzi et al. .............. 106/308 Q |
| 4,168,180 A | * | 9/1979 | Peabody ................ 106/308 M |
| 4,244,863 A | * | 1/1981 | Hemmerich et al. ..... 260/42.55 |
| 4,391,648 A | * | 7/1983 | Ferrill .................... 106/308 M |
| 4,909,853 A | * | 3/1990 | Wienkenhover et al. .... 106/503 |
| 5,171,613 A | * | 12/1992 | Bok et al. .................... 427/422 |
| 5,439,968 A | * | 8/1995 | Hyche ......................... 524/504 |
| 5,449,727 A | * | 9/1995 | Krieg et al. ................ 526/273 |
| 5,455,288 A | * | 10/1995 | Needham .................... 523/205 |
| 5,554,217 A | * | 9/1996 | Babler ........................ 106/494 |
| 5,589,531 A | * | 12/1996 | Menashi et al. ............ 524/409 |
| 5,667,580 A | * | 9/1997 | Babler ........................ 106/499 |
| 5,880,193 A | * | 3/1999 | Berke et al. ................. 524/385 |
| 5,985,019 A | * | 11/1999 | McCrae et al. ............. 106/413 |
| 6,106,896 A | * | 8/2000 | Nielsen et al. .............. 427/195 |
| 6,239,201 B1 | * | 5/2001 | Edelmann et al. .......... 524/148 |
| 6,365,648 B1 | * | 4/2002 | Couperus et al. .......... 523/340 |
| 2002/0098435 A1 | * | 7/2002 | Rohr et al. ............ 430/108.22 |
| 2002/0161083 A1 | * | 10/2002 | Schafer et al. .............. 524/265 |

FOREIGN PATENT DOCUMENTS

| | | | |
|---|---|---|---|
| DE | 1239023 | 9/1964 | |
| DE | 26 52 628 | 5/1978 | |
| DE | 195 16 387 A1 | 11/1996 | |
| WO | WO 95/31507 A1 | * 11/1995 | ........... C09B/67/20 |

OTHER PUBLICATIONS

W. Herbst, K. Hunger, "Industrielle Organische Pigmente", pp. 91–92.

* cited by examiner

Primary Examiner—Rip A. Lee
(74) Attorney, Agent, or Firm—Frommer Lawrence & Haug LLP

(57) ABSTRACT

The invention relates to a process for preparing nondusting free-flowing pigment concentrates with removal of the water from pigment suspensions comprising polymers and dispersants in a fluidized bed drier. The resulting bead-form pigment concentrates are nondusting and readily free-flowing. The invention further embraces the use of pigment concentrates prepared in this way for coloring plastics and polymers.

14 Claims, 1 Drawing Sheet

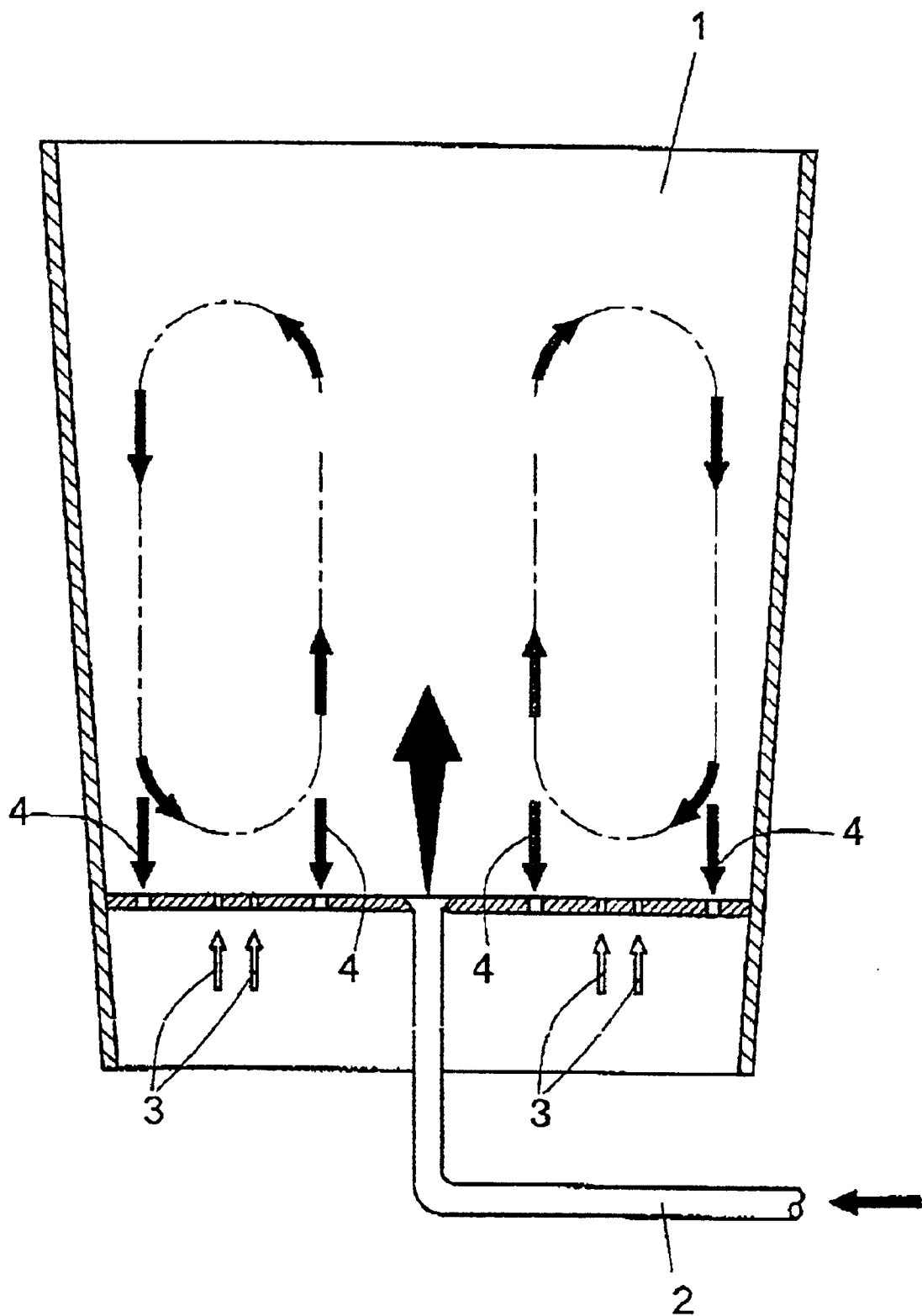

PREPARATION OF NONDUSTING FREE-FLOWING PIGMENT CONCENTRATES

RELATED APPLICATIONS

This application claims priority to German application 100 60 718.7, filed Dec. 7, 2000, herein incorporated by reference.

BACKGROUND OF THE INVENTION

The invention relates to a process for preparing nondusting free-flowing pigment concentrates with removal of the water from pigment suspensions comprising polymers and dispersants in a fluidized bed drier. The resulting bead-form pigment concentrates are nondusting and readily free-flowing. The invention further embraces the use of pigment concentrates prepared in this way for coloring plastics and polymers.

Related Applications

Pigment concentrates and processes for preparing them for the abovementioned applications can be found in the prior art.

For instance, DE-B-12 39 093 describes carrier materials based on a mixture of an amorphous ethylene-propylene block copolymer and a crystalline polypropylene for preparing pigment concentrates. DE-A-26 52 628 relates to the use of polypropylene waxes having a viscosity of from 500 to 5 000 mPas (170° C.) and an isotactic fraction of from 40 to 90%.

Plastics are normally colored using pigment concentrates (pigment masterbatches). The pigment concentrates, prepared by extrusion processes, contain the corresponding pigment in concentrations of from about 20 to 70% by weight, a polymeric carrier, and usually different kinds of substances (waxes/wetting agents/dispersants) which assist the process of incorporating the pigments and ensure highly uniform distribution (dispersion) of the pigments.

In certain cases, the dispersing of organic pigments is circumvented through the use of pigment flush pastes. The preparation of what are known as flush pastes is prior art and is described in more detail by W. Herbst and K. Hunger in "Industrielle Organische Pigmente", $2^{nd}$ edition, pp. 91–92, VCH Verlagsgesellschaft mbH, D-6945 Weinheim, 1995. In this technology, the aqueous pigment presscake normally obtained initially in pigment preparation is not dried and ground but is instead treated in a "flush" process with oily binders, such as alkyd resins, mineral oils, cellulose acetobutyrate or other suitable substances. The water on the pigment surface is displaced by the organic substances. By flushing, therefore, the process steps of pigment preparation that lead in particular to the formation of agglomerates, namely drying and grinding, are avoided.

Flush pastes are prepared in an internal compounder. Presscake and dispersing waxes are mixed in the compounder; the water is removed by heating and reduced pressure; the wax goes onto the pigments. This is a batch process, and the pigment preparation must subsequently be standardized.

In the film segment, bittiness disrupts the visual appearance and leads to cracking and to unwanted light scattering effects.

In the production of polymeric fiber, pigment agglomerates cause clogging of the extruder's melt grids and cause fiber breakage, which is generally accompanied by prolonged downtimes and increased plant cleaning demand.

In DE-A-195 16 387, highly effective dispersing is achieved by means of a dispersant comprising a mixture of different polyolefin components and special polyacrylic esters.

Pigment preparations in the solid state may be prepared by mixing as a dry blend and/or by melt mixing in appropriate extruders or compounders.

Normally, the pulverulent organic or inorganic pigments are mixed together with granular or pulverulent polymers and corresponding waxes. The waxes too are used in powder form. They are obtained either by spraying techniques or milling processes. The particle sizes of these waxes are generally <1 000 $\mu$m. The particle size distributions vary, of course, depending on the process used.

For optimum dispersing, up to 40% by weight of wax is needed, depending on pigment type. Since excessive amounts of wax lead again and again to instances of migration and deposits on the dies, there is particular interest in preparing pigment concentrates comprising effectively dispersed pigments with very small fractions of waxes.

SUMMARY OF THE INVENTION

The invention provides in a first embodiment a process for preparing nondusting, free-flowing, organic pigment concentrates from pigment presscakes obtained in pigment preparation, with the addition of wetting agents and dispersants, the water being removed in a fluidized bed process.

BRIEF DESCRIPTION OF THE DRAWING

FIG. 1 depicts fluidized bed drying of an aqueous formulation.

DETAILED DESCRIPTION OF THE INVENTION

In this process, the water between the primary pigment particles is removed and replaced by the particles - from 0.1 to 1.0 $\mu$m in size - of active substance, i.e., wetting agent, dispersing additive, and, where appropriate, polymer, thereby preventing agglomeration of the pigment particles.

The fluidized bed drying of the pigment/active substance suspension, in accordance with the invention, produces bead-form, nondusting, readily free-flowing pigment preparations.

The product, therefore, is a pigment concentrate which, in general, needs not be dispersed further with other auxiliaries in a twin screw extruder.

The fluidized bed drying process is generally operated continuously with simultaneous standardizing. However, a batchwise mode of operation is also possible.

In the text below, the fluidized bed drying is explained with reference to FIG. 1.

The aqueous formulation, consisting of the pigment presscake and the solutions, dispersions or emulsions of active substance, is sprayed into the fluidized bed drier using a hose pump, spraying taking place from below through a nozzle 2 into the fluidized bed chamber 1. As an alternative, supplying it via two or more nozzles from above and/or from below into the fluidized bed drier is also possible. If desired, it is possible to introduce different components through different nozzles. Hot air 3, which is passed in countercurrent to or in cocurrent with the suspension, causes evaporation, by fluidization, of the water emerging at the top from the fluidized bedchamber 1. The suspension remains in the fluidized bed chamber 1 for a preset time and leaves the chamber at the bottom outlet as dry, nondusting, classified, free-flowing granules 4.

Powder concentrates in the sense of the present invention comprise organic and inorganic pigments and also mixtures of organic and inorganic pigments which may be obtained as an aqueous presscake. In customary pigment concentrates, therefore, these are generally present in a proportion of from about 30 to about 70% by weight.

With particular preference in the context of the present invention, the pigment concentrates comprise from about 30 to about 60 parts by weight of the organic and/or inorganic pigments in powder form, based on 100 parts by weight of the pigment concentrates.

Particularly preferred polymer carriers in the context of the present invention comprise, in particular, pulverulent polyethylene (PE), polypropylene (PP), acrylonitrile-butadistyrene (ABS), polystyrene (PS), polyamide (PA), polyurethane (TPU), polyvinyl chloride (PVC), polyethylene terephthalate (PET), polycarbonate (PC), acrylates, and PTFE.

Particularly preferred polymer carriers which may be used as aqueous dispersions in the context of the present invention comprise, for example, polyethylene (PE), polypropylene (PP), polyacrylates (AC), polyurethane (TPU), and butadiene rubber.

The pigment is bound by the active substances and nondusting granules are formed.

In accordance with the invention, a fluidized bed unit is used for continuous granule drying from suspensions and solutions or else, especially, with simultaneous supplying of powderous substances.

The resulting granules are discharged in classified form from the process chamber and, where necessary, are cooled. This operation is variable and may be adapted individually to the specific product requirements.

By way of dispersants and wetting agents as ingredients of the aqueous formulations for treating the pigment presscake, it is possible with preference to use the following substances:

polyethylene waxes, polar, nonpolar
polypropylene waxes, nonpolar
paraffin waxes
ethylene-vinyl acetate waxes
fatty acid esters
metal soaps
montan waxes
polyalkyl acrylates
organo-modified siloxanes
acid waxes
ester waxes
oxidized waxes
waxes, pulverulent
waxes, micronized
waxes, water-dispersed Their amount in the pigment concentrate is preferably from about 0.1 to about 50.0 parts by weight.

The invention further provides for the use of pigment concentrates for coloring plastics and polymers.

WORKING EXAMPLES

General test procedure for preparing the pigment formulation for introduction into the fluidized bed drier:
Formulating the Suspensions
X parts by weight of aqueous pigment presscake, dry matter content 30–50% by weight (remainder water)
Y parts by weight of aqueous formulation dispersants and wetting agents
Z parts by weight of aqueous polymer dispersion The respective formulation is mixed in an Ultraturrax at a speed of about 3,000 rpm at room temperature.

The aqueous pigment formulation therefore contains about 25–45% dry matter and has a viscosity of about 800 mPas. It is readily conveyable with a hose pump.

General Test Procedure for the Fluidized Bed Process:

First of all a nucleating agent is introduced into the fluidized bed reactor. The amount is dependent on the size of the machine. In the case of the laboratory machine used, the amount of nucleating agent is about 600 g.

The nucleating agent is generally a pigment concentrate, bead granules with a diameter of about 1,500 $\mu$m.

Prior to fluidized bed drying, the nucleating agent is located on the base screen having a mesh size of about 100 $\mu$m.

At the start of fluidized bed drying, heated air is blown through the screen from below and as a result the nucleating agent is fluidized in the chamber. A so-called fluidized bed is produced.

At the same time, likewise from below, the aqueous pigment suspension is sprayed into the fluidized chamber through a nozzle having a diameter of 1.2 mm.

By means of the hot air, the water is evaporated, and at the same time the active substances (dispersant, wetting agent, and, where appropriate, polymer) go on to the primary particles of the pigment, thereby preventing the agglomeration of the primary particles.

The primary particle/active substance mixture deposits on the nucleating agents.

After a certain time, the nucleating agent is taken off together with the dry matter of the new formulation, so that only uniform granules of the new formulation introduced are formed.

| Process data | |
|---|---|
| Air quantity: | 20% |
| Air temperature: | about 105° C. |
| Outgoing air temperature: | about 60° C. |
| Product temperature: | about 70° C. |
| Spraying pressure: | 1.5 bar |
| Spraying rate: | about 36 g/min. |

To determine the quality of dispersing of pigments in pigment masterbatches, the following tests were used:

1. Pressure Filter Test

In this test, a mixture of masterbatch and polymeric carrier with a pigment content of 10% by weight is melted in an extruder and extruded for a defined filter assembly. The increase in pressure is monitored over a defined time period (1 h). As a measure of the quality of the masterbatch, the pressure filter index (PF) is calculated in accordance with the following formula:

$$PF=(P_{max.}-P_o)\times F\times 100/t\times K\times G \ (bar\times cm^2/g)$$

where $P_{max.}$=final pressure (bar)

$P_o$=operating pressure without masterbatch $F$=filter area (cm$^2$)

$t$=measurement period (min.)

$K$=concentration (%)

$G$=extruder throughput (g/min.)

The pressure filter index indicates the extent to which a filter assembly becomes clogged by agglomerates. A very low pressure filter index points to very good dispersing of the pigment concentrates.

2. Color Strength

Another test for determining the quality of dispersing is to determine the color strength of a masterbatch. Here, the masterbatch is diluted with the polymeric carrier to a pigment content of 0.2% by weight and reduced with titanium dioxide (10 parts by weight of titanium dioxide per part by weight of pigment). This material is injection molded to plates on which the coloristic measurements are conducted. The CIE-Lab color system has proven appropriate for these measurements.

The higher the color strength in comparison with a reference sample, the better the dispersion of the pigment and the lower the agglomerate fraction in the parent pigment masterbatch.

For the purpose of comparison, the color strength of the reference samples is set by definition at 100%.

3. Film Speck Rating

A further test is the visual assessment of pigment specks in a polymer film about 50 μm thick, viewed under the microscope. A PE film is prepared using 1% by weight of a 40% by weight pigment concentrate. The size and number of the pigment specks is defined by ratings:
Rating 1: very few or no pigment specks=good quality
Intermediate ratings
Rating 6: very many pigment specks =poor quality Example 1

40 parts (based on solids) of Pigment Red 57:1 (from pigment presscakes, water about 70%)
10 parts of polyalkyl acrylate (Tegomer®DA 102, Goldschmidt AG) 50 parts ofpolyethylene polymer dispersion Example 2

50 parts (based on solids) of Pigment Red 57:1 (from pigment presscakes, water about 70%)
15 parts of polyalkyl acrylate (Tegomer®DA 102, Goldschmidt AG)
35 parts of polyethylene polymer dispersion[1]

Example 3

40 parts (based on solids) of Pigment Green 7 from pigment presscakes
10 parts of organosiloxane (Tegopren®6875, Goldschmidt AG) 50 parts of polyethylene polymer dispersion Example 4

50 parts (based on solids) of Pigment Blue 15:1 from pigment presscakes
5 parts of organosiloxane (Tegopren®6875, Goldschmidt AG)
10 parts of polyalkyl acrylate (Tegomer®DA102, Goldschmidt AG)
35 parts of polyethylene polymer dispersion[1]

Comparative Example 1
Preparation in a Twin Screw Extruder
40 parts of Pigment Red 57:1
30 parts polypropylene wax (dispersant)[2]
30 parts of polypropylene (Finapro®PPH 11012)

The formulation was premixed in a tumble mixer at room temperature and then mixed and dispersed in a twin screw extruder at from 180 to 220° C. The melt extrudate which formed was cooled and chopped using a granulator. This gave relatively coarse, uniform cylindrical granules.

Comparative Example 2

50 parts of Pigment Red 57:1
30 parts of polyethylene wax[3]
20 parts of polypropylene (Finapro® PPH 11012)

The ingredients were introduced into a compounder in which the water was removed by heating and reduced pressure. The wax went onto the pigment surface (flushing process). Following the process, the material from the compounder had to be ground. This gave a ground material which differed in particle size and included dusting fractions.

Comparative Example 3

50 parts (based on solids) of Pigment Red 57:1 (from presscakes, water about 70%)
50 parts of polyethylene wax[4]

The components were subjected to a flushing process and then dispersed in ballmills. This gave a preparation having different particle sizes and dusting fractions.
1) Mixture of polyethylene primary dispersion and polyethylene wax emulsion with ionic emulsifiers
2) Standard polypropylene wax
   Softening point: about 160° C.
   Density at 20° C.: 0.89 g/cm$^3$
   Viscosity at 170° C.: about 1 800 mPas
3) Standard polyethylene wax
   Softening point: about 100° C.
   Density at 20° C.: 0.92 g/cm$^3$
   Viscosity at 140° C.: from about 100 to 200 mPas
4) Standard polyethylene wax
   Softening point: about 102° C.
   Density at 20° C.: 0.91 g/cm$^3$
   Viscosity at 140° C.: about 200 mPas

| Examples | Particle size distribution of the preparation | Color strength in comparison to Comp. Example 1 | Film speck rating | Pressure filter index bar × cm$^2$/g |
|---|---|---|---|---|
| 1 | Bead granules 100% 1200 μm | 118 | 3 | 0.5 |
| 2 | Bead granules 100% 1200 μm | 116 | 3 | 1.0 |
| 3 | Bead granules 100% 1250 μm | 110 | 3 | 1.5 |
| 4 | Bead granules 100% 1300 μm | 115 | 2 | 1.0 |
| Comp. 1 | Cylindrical granules 100% 3 × 4 mm | 100 | 5 | 12.0 |
| Comp. 2 | Ground material <800 μm 100% <500 μm 92% <300 μm 77% <100 μm 32% | 115 | 2 | 1.5 |
| Comp. 3 | Ground material <800 μm 100% <500 μm 89% <300 μm 70% <100 μm 34% | 120 | 3 | 1.8 |

The above description is intended to be illustrative and not limiting. Various changes or modifications in the embodiments described herein may occur to those skilled in the art. These changes may occur without departing from the scope or spirit of the invention.

What is claimed is:

1. A process for preparing a pigment concentrate, which is non-dusting and free-flowing, which consists of mixing an aqueous pigment press cake, optionally at least one wetting agent, at least one dispersant, and at least one pulverulent polymer carrier, spraying the mixture obtained into a fluidized bed drier wherein the water is removed and particles are formed.

2. The process according to claim 1, wherein the process is conducted continuously or batchwise.

3. The process according to claim 1, wherein the pulverulent polymer carrier is polyethylene, polypropylene, acrylonitrile-butadiene-styrene, polystyrene, polyamide, polyurethane, polyvinyl chloride, polyethylene terephthalate, polycarbonate, poly(meth)acrylate, polyvinyl acetate, polyvinyl alcohol or a fluoropolymer.

4. The process according to claim 3 wherein the pulverulent polymer is polymethacylate or polytetrafluoroethylene.

5. The process according to claim 1, wherein the dispersant is selected from the group consisting of nonpolar and polar polyethylene waxes, nonpolar polypropylene waxes, paraffin waxes, ethylene-vinyl acetate waxes, fatty acid esters, metal soaps, montan waxes, and polyalkyl acrylates.

6. The process according to claim 1, wherein the pulverulent polymer carrier is in a solution, emulsion or dispersion with water.

7. The process according to claim 1 wherein a wetting agent is present.

8. The process according to claim 7 wherein the wetting agent is an organo-modified siloxane.

9. A pigment concentrate, which is non-dusting and free-flowing and in the form of beads of a uniform particle size, that is obtained by the process according to claim 1.

10. The pigment concentrate, according to claim 9, which contains pigments in an amount of from about 30% to about 60% by weight.

11. The pigment concentrate according to claim 9, which contains a dispersant and wetting agent in an amount of from about 0.5% to about 50% by weight.

12. A method for coloring plastics or polymers which comprises adding a pigment concentrate according to claim 9, to the plastics or polymers.

13. An article, which comprises a pigment concentrate according to claim 9.

14. The article according to claim 13, wherein said article is a plastic or a polymer.

* * * * *

UNITED STATES PATENT AND TRADEMARK OFFICE
CERTIFICATE OF CORRECTION

PATENT NO.         : 6,743,835 B2
APPLICATION NO. : 10/006962
DATED              : June 1, 2004
INVENTOR(S)        : Werner Schäfer et al.

It is certified that error appears in the above-identified patent and that said Letters Patent is hereby corrected as shown below:

On the title page item [73] ASSIGNEE: after "Goldschmidt AG, Essen (DE)"
insert --Glatt Ingenieurtechnik GmbH, Weimer (DE)--

Signed and Sealed this

Eighth Day of January, 2008

JON W. DUDAS
*Director of the United States Patent and Trademark Office*